March 7, 1972 M. B. L. HEPPS ET AL 3,647,623
FUEL ELEMENT FOR A NUCLEAR REACTOR
Filed Feb. 26, 1969
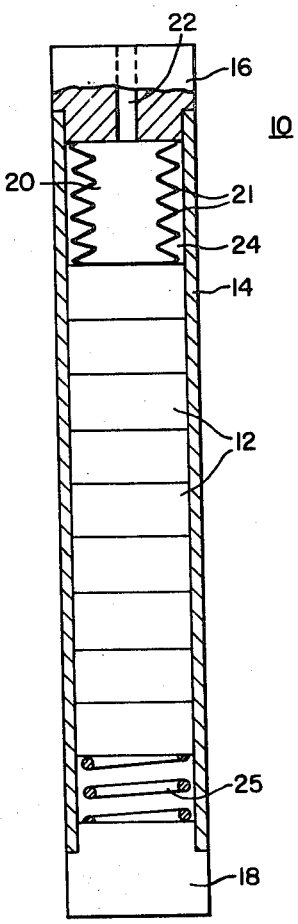
WITNESSES
Theodore F. Wrobel
James F. Young
INVENTORS
Michael B.L. Hepps
and Harry M. Ferrari
BY M.B.L. Hepps
ATTORNEY 3,647,623
FUEL ELEMENT FOR A NUCLEAR REACTOR
Michael B. L. Hepps, North Versailles, and Harry M. Ferrari, Pittsburgh, Pa., assignors to Westinghouse Electric Corporation, Pittsburgh, Pa.
Filed Feb. 26, 1969, Ser. No. 802,544
Int. Cl. G21c 3/04
U.S. Cl. 176—68
4 Claims

ABSTRACT OF THE DISCLOSURE

A metallic clad fuel element for nuclear reactors which has a bellows-like member internally supported therein and communicably coupled with the environment of the fuel element so as to maintain an internal pressure substantially equal to the external or environmental pressure during burnup and load follow. The bellows-like member is preferably constructed of a material with a relatively high modulus of elasticity so that it may readily expand and contract to compensate for the amount of fission gas given off by the fuel during burnup.

BACKGROUND OF THE INVENTION

This invention relates to fuel elements, and more particularly to metallic clad pressurized fuel elements having a nuclear fuel contained therein which gives off fission gases during burnup.

Many designs of presently manufactured commercial nuclear reactors have their fuel inventory of fissile material contained within a plurality of elongated metallic clad fuel elements. The fuel generally consists of juxtaposed ceramic pellets of for example uranium dioxide contained within the metallic sheath. The sheath itself is exposed to a high temperature, high pressure environment. For example, in a pressurized water reactor, a fuel element would be exposed to a pressure in excess of 2,000 p.s.i. and a temperature above 500° F.

It has recently been suggested that in order to reduce the thickness of the cladding and to maintain integrity under the high pressure conditions which exist within the reactor pressure vessel that it would be well to internally pressurize the fuel rods before insertion into the core of a nuclear reactor. During burnup of the fissile fuel pellets, it is known that fission gases are given off which vary the internal pressure within the fuel cladding. Although internal pressurization greatly reduces the differential pressure across the cladding and thereby increases the reliability of such a fuel rod, a problem is created after substantial burnup due to the amount of fission gases which accumulate within such a fuel rod. Thus, in order to manufacture reliable fuel elements and particularly such fuel elements as are to be pressurized during manufacture, there must be provided some means for accommodating fission gases yielded during burnup. An example of such a pressurized fuel element with fission gas accommodating means may be found in a copending application No. 738,237, filed June 19, 1968, by H. M. Ferrari, and assigned to Westinghouse Electric Corporation.

Another solution to the above problem of fission gas accumulation may be found in a copending application No. 752,299 filed Aug. 13, 1968 by H. N. Andrews et al., and assigned to the Westinghouse Electric Corporation. According to this application one or more bellows-like members are provided interior of fuel elements each having an internally mounted pin. As fission gases accumulate the various bellows are punctured providing additional void space for fission gas accumulation. However, in both of the above cited applications, a plot of the internal pressure versus time for such a fuel rod shows a saw-tooth pattern with steeply decreasing pressure gradients at the predetermined points of bellows failure or puncture. A cyclic differential pressure pattern is thereby produced on the sheath or cladding. It is possible that the sudden increase in differential pressure as each bellows is failed might lead to reduced reliability of the fuel rods especially where a material having a relatively low modulus of elasticity were used. Unfortunately, materials such as zircaloy which are desirable as the cladding for a fuel element because of their relatively low neutron capture cross-section with respect to thermal neutrons generally have a low modulus of elasticity.

Another solution of the prior art may be found in Pat. No. 3,291,698 issued Dec. 13, 1966 of P. Fortesque. Here it is suggested that a portion of the fuel element cladding be formed into expandable lobes. These lobes are meant to act as bellows-like members to balance the internal and external pressure during burnup. However, it is to be noted that this fuel element is suggested for a rather low pressure environment of a gas cooled reactor and that this use enables the cladding to be relatively thin in order to act as a bellows. If a material of low neutron capture cross-section having a relatively low modulus of elasticity were used in the area of expandable lobes, it would be plastically deformed and might only stand up for a few cyclic operations in a high pressure environment. Moreover, such a fuel element would be difficult to laterally support within the grid structures now used in high pressure environments of water cooled nuclear reactors.

SUMMARY OF THE INVENTION

A more reliable fuel element which is neither subject to the usual substantial differential pressure across the cladding thereof nor to varying differential pressure due to fission gas accumulation may be produced in accordance with this invention by providing an internally pressurized fuel element with an internally supported bellows-like member which is communicably coupled with the environment of the fuel element.

The fuel element is in outward configuration substantially identical with those now produced and may accordingly be supported in a spring grid structure as for example that shown in Pat. No. 3,379,617 of H. N. Andrews et al. and assigned to the Westinghouse Electric Corporation. A bellows-like member is internally supported within the fuel element as by welding or brazing to an end cap or otherwise suitably affixed thereto. The interior of the bellows is communicably coupled with the environment of the fuel element by providing a hole in the end plug to which it is affixed. Accordingly the pressure within the bellows is at all times identical to that of the environment and therefore equal to the pressure acting upon the outside surface of the cladding. As fission gases accumulate, the bellows contracts so as to maintain the internal pressure equal to the external pressure. In order to have a high enough internal pressure at the beginning of life to balance the environmental pressure existing within the bellows, the fuel element may be pressurized as by sealing it within a high gas pressure container or by providing a material which gives off substantial gas when subject to heating.

The bellows may be constructed of materials such as nickel, stainless steel, or a nickel base alloy with a high modulus of elasticity. Such an expedient would not be practical for the cladding since such materials, as exemplified, generally have a relatively high neutron capture cross-section in the thermal range and would greatly lower the efficiency of the reactor and the utilization of the fissible fuel inventory therein. Biaxial strain fatigue studies comparing the behavior of materials having a high modulus of elasticity from which a bellows-like member could be constructed with materials of a low neutron capture cross-section which are suitable for cladding indicate that the bellows-like member can withstand relatively high cyclic operation and thus should be utilized for taking the strain which would otherwise have to be borne by the cladding.

DESCRIPTION OF THE DRAWING

For a better understanding of the invention, reference may be had to the accompanying drawing which shows a fuel element, in accordance with this invention, provided with an internally supported bellows-like member.

DESCRIPTION OF THE PREFERRED EMBODIMENT

A fuel element 10 in accordance with this invention is shown in FIG. 1. Fuel element 10 comprises pellets 12 of a suitable nuclear fuel such as uranium dioxide cladded in a metallic sheath 14, suitably of zircaloy. The ends of the sheath 14 are sealed as by welding end plugs 16 and 18 thereto.

Fuel element 10 has an internally supported bellows 20 which is suitably constructed of nickel, stainless steel, or a nickel base alloy which is welded or otherwise suitably affixed to an end plug as for example 16. The bellows 20 preferably has a plurality of horizontal convolutions 21 so as to have a wide range of axial movement with respect to the fuel element 10. The interior of the bellows 20 is communicably coupled with the environment of the fuel element by providing a hole 22 in the end plug 16. The hole 22 is suitably dimensioned so that crudding would not block access of the coolant, for example pressurized water, to the interior of the bellows 20.

The interior of the fuel element 10 may include a space around the bellows 20 designated by the numeral 24. This space may optionally be pressurized with a gas such as helium or packed with a substance which would produce gas as a fuel element was brought to operating temperature. This last-mentioned feature would insure improved pressure balancing between the internal pressure within the fuel rod clad 14 and the external coolant pressure which in a pressurized water reactor would be in excess of 2000 p.s.i. and would also assure that the bellows 20 would not be torn loose from the end plug 16 when it first "sees" the environmental pressure.

A light shipping spring 25 may optionally be supported by the end plug, say 18, opposite that to which the bellows 20 is affixed. Spring 25 functions to keep the pellets 12 from moving during shipping and assembly.

During operation, the bellows 20 contracts to provide additional void space for the accumulation of fission gases. The internal pressure should be brought as quickly as possible to the level of the external pressure so that the bellows 20 achieves an initial equilibrium position as quickly as feasible. This can be accomplished by providing a sufficient gas pressure or gas generation material within the area 24 prior to welding the end plug 18. Such means of pressurization are described in greater detail in a copending application No. 706,291 by H. M. Ferrari, filed Feb. 19, 1968, now abandoned, and assigned to the Westinghouse Electric Corporation. It is important to note that during cyclic temperature changes in the reactor environment due to load follow or emergency shutdown procedures that the bellows member 20 would act either by expanding or contracting to maintain an essentially zero differential pressure across the bellows 20 and the sheath 14. Thus functionally the bellows acts to relieve loads which would otherwise be borne by the sheath 14.

While there has been shown and described what is considered to be the preferred embodiment of the invention, modifications will readily occur to those skilled in the art. Accordingly, it is not desired that the invention be limited to the specific arrangements or embodiment shown and described but rather that the true scope of the invention is intended to be delineated in the appended claims.

We claim as our invention:

1. A fuel element for a nuclear reactor, which comprises:

a generally tubular sheath containing fissionable material, an end wall of said sheath having an opening therein to the reactor environment;

a movable bellows member totally within said sheath and sealed about said opening, said member isolating the interior of said sheath containing said fissionable material from said environment of the fuel element whereby the movement of said movable member acts to balance the pressure interior of the sheath with the pressure external to the fuel element;

the interior of said sheath being initially pressurized with a gaseous atmosphere at a selected pressure above 100 p.s.i..

2. The fuel element of claim 1 wherein the movable bellows member has generally horizontal convolutions and one closed end, the open end of said bellows being sealed about the opening in a wall of said sheath.

3. The fuel element of claim 2 wherein the sheath is constructed from a material having a low neutron capture cross-section at least with respect to neutrons of the thermal range, and the bellows member is constructed from a material having a higher modulus of elasticity than the material from which the sheath is constructed.

4. The fuel element of claim 2 wherein the sheath includes end plugs, said end plugs being hermetically secured to the sheath, said bellows member being hermetically secured to at least one of said end plugs, and said end-plug having a hole therethrough which communicably couples the interior of the bellows with the environment of the fuel element.

References Cited

UNITED STATES PATENTS

| 3,010,889 | 11/1961 | Fortesque | 176—37 X |
| 3,141,829 | 7/1964 | Fortesque | 176—68 |
| 3,141,830 | 7/1964 | Klepfer et al. | 176—68 |
| 3,157,580 | 11/1964 | Williams | 176—68 |
| 3,291,698 | 12/1966 | Fortesque | 176—72 X |
| 3,350,271 | 10/1967 | Maidment et al. | 176—80 |
| 3,399,112 | 8/1968 | Dodd | 176—37 X |

BENJAMIN R. PADGETT, Primary Examiner

G. G. SOLYST, Assistant Examiner

U.S. Cl. X.R.

176—79